United States Patent
Maganti et al.

(10) Patent No.: US 11,846,223 B2
(45) Date of Patent: Dec. 19, 2023

(54) DIESEL EXHAUST TREATEMENT APPARATUS AND METHODS

(71) Applicant: DINEX A/S, Middlefart (DK)

(72) Inventors: Venkata Rama Nataraj Maganti, Dublin, GA (US); Ryan Cook, Dublin, GA (US); Rogier Van der Ouderaa, Warrington (GB); Rajiv Krishnakumar, Middelfart Denmark (DK); Jim Elkjaer Bebe, Middelfart Denmark (DK); Alexandru Serban, Middelfart Denmark (DK); Janis Deinis, Jelgava Latvia (LV)

(73) Assignee: Dinex A/S, Middlefart (DK)

( * ) Notice: Subject to any disclaimer, the term of this patent is extended or adjusted under 35 U.S.C. 154(b) by 0 days.

(21) Appl. No.: 17/671,231

(22) Filed: Feb. 14, 2022

(65) Prior Publication Data

US 2022/0162972 A1    May 26, 2022

Related U.S. Application Data

(63) Continuation of application No. 17/032,674, filed on Sep. 25, 2020, now Pat. No. 11,286,828.

(51) Int. Cl.
*F01N 3/20* (2006.01)
*F01N 3/08* (2006.01)
(Continued)

(52) U.S. Cl.
CPC ........... *F01N 3/208* (2013.01); *F01N 3/0821* (2013.01); *F01N 13/017* (2014.06); *B01D 53/94* (2013.01);
(Continued)

(58) Field of Classification Search
CPC ........ F01N 3/206; F01N 3/2066; F01N 3/208; F01N 3/035; F01N 3/032; F01N 3/0231;
(Continued)

(56) References Cited

U.S. PATENT DOCUMENTS 8,104,267 B2 *   1/2012   Kimura ................. F01N 13/008
                                                   60/276
8,501,104 B2 *   8/2013   Honda .................... F01N 3/106
                                                   422/171
(Continued)

FOREIGN PATENT DOCUMENTS

CN          102292526 A   * 12/2011   ............. F01N 3/025

*Primary Examiner* — Binh Q Tran
(74) *Attorney, Agent, or Firm* — Meunier Carlin & Curfman LLC

(57) ABSTRACT

A diesel exhaust treatment system for treating exhaust gas from a diesel engine comprising at least one diesel oxidation catalyst (DOC), at least one diesel particulate filter (DPF), at least one diesel exhaust fluid mixing chamber and at least one selective catalytic reduction converter (SCR). In one desirable embodiment, two DOCs, two DPFs, two SCRs, and two diesel exhaust fluid mixing chambers are arranged in parallel. The disclosed system is configured to reduce back pressure and increase urea vaporization while effectively using available space and providing improved access to components. The system can be coupled to a vehicle frame rail, such as the frame rail of a heavy duty truck.

3 Claims, 10 Drawing Sheets

(51) Int. Cl.
*F01N 13/00* (2010.01)
*F01N 3/28* (2006.01)
*F01N 3/023* (2006.01)
*B01D 53/94* (2006.01)

(52) U.S. Cl.
CPC ........ *B01D 53/9495* (2013.01); *F01N 3/0231* (2013.01); *F01N 3/0233* (2013.01); *F01N 3/0871* (2013.01); *F01N 3/206* (2013.01); *F01N 3/2066* (2013.01); *F01N 3/2821* (2013.01); *F01N 3/2882* (2013.01); *F01N 13/009* (2014.06); *F01N 13/0097* (2014.06); *F01N 2330/32* (2013.01); *F01N 2330/38* (2013.01); *F01N 2490/06* (2013.01); *F01N 2610/02* (2013.01)

(58) Field of Classification Search
CPC ...... F01N 3/0233; F01N 3/021; F01N 3/2093; F01N 3/0892; F01N 3/0871; F01N 3/0821; F01N 3/28; F01N 3/2803; F01N 3/281; F01N 3/2814; F01N 3/2817; F01N 3/2821; F01N 3/2825; F01N 3/2828; F01N 3/2882; F01N 3/2892; F01N 13/009; F01N 13/0093; F01N 13/0097; F01N 13/02; F01N 13/017; F01N 13/011; F01N 2260/06; F01N 2490/06; F01N 2330/06; F01N 2330/30; F01N 2330/32; F01N 2330/34; F01N 2330/36; F01N 2330/38; F01N 2610/02

See application file for complete search history.

(56) References Cited

U.S. PATENT DOCUMENTS

| | | | | |
|---|---|---|---|---|
| 10,669,912 B2 * | 6/2020 | Shiva | ..................... | F01N 3/2066 |
| 2010/0186393 A1 * | 7/2010 | Kowada | .................. | F01N 3/035 |
| | | | | 60/295 |
| 2011/0099978 A1 * | 5/2011 | Davidson | ........... | B01D 53/9495 |
| | | | | 60/297 |
| 2012/0260635 A1 * | 10/2012 | Aneja | ..................... | F01N 3/033 |
| | | | | 60/297 |
| 2015/0059319 A1 * | 3/2015 | Shiva | ........................ | F01N 3/28 |
| | | | | 60/295 |
| 2017/0167344 A1 * | 6/2017 | Alano | ................... | F01N 3/2066 |
| 2018/0023450 A1 * | 1/2018 | Zhang | ..................... | F01N 3/023 |
| | | | | 60/602 |
| 2020/0003099 A1 * | 1/2020 | Silver | ................... | F01N 3/2803 |

* cited by examiner

DIESEL EXHAUST TREATEMENT APPARATUS AND METHODS

CROSS-REFERENCE TO RELATED APPLICATION

In accordance with 37 C.F.R 1.76, a claim of priority is included in an Application Data Sheet filed concurrently herewith. Accordingly, the present invention claims priority as a continuation of U.S. patent application Ser. No. 17/032,674, entitled "DIESEL EXHAUST TREATEMENT APPARATUS AND METHODS" filed Sep. 25, 2020.

TECHNICAL FIELD

The technology disclosed herein relates to the treatment of diesel engine exhaust such as diesel engine exhaust from heavy duty truck diesel engines.

BACKGROUND

Diesel engines are typically subject to exhaust emissions limits set by the Environmental Protection Agency (EPA). Such emissions standards seek to protect the environment by reducing harmful pollutants being released into the atmosphere by diesel engines. For example, the EPA has previously mandated a reduction in allowable levels of particulate matter and nitrogen oxides in exhaust gases. A number of diesel engines are unable to meet such emission standards. Moreover, it is desirable to reduce pollutants even in the absence of any such government mandated standards. Thus, the present disclosure aids diesel engines with a device and method that reduces the level of pollutants in the exhaust.

More particularly, the disclosure includes a diesel exhaust treatment system and method that treats the diesel exhaust downstream from a diesel engine, before the exhaust is released into the air, that can be employed in an aftertreatment device. While previous efforts have been made to address the treatment of diesel exhaust, the present disclosure reduces back pressure and increases urea vaporization while effectively using available space in such a manner as to provide more ready access to certain components.

Generally described, untreated diesel exhaust enters the diesel exhaust aftertreatment system through an exhaust gas inlet. The diesel exhaust is first treated by one or more diesel oxidation catalysts (DOCs), wherein hydrocarbons and carbon monoxide are catalytically oxidized to form carbon dioxide and water. The DOC also oxidizes the nitrogen oxide (NO) which helps in passive regeneration as particulate matter oxidizes at a lower temperature in the presence of nitrogen dioxide ($NO_2$). The additional $NO_2$ also helps with the SCR reaction as SCR reaction is ideal when the $NO:NO_2$ ratio is close to 50%. The DOC also helps in oxidizing the soluble organic fraction (SOF) portion of the soot, which reduces the particulate matter in the exhaust. The diesel exhaust then passes through the one or more diesel particulate filters (DPFs), which filter out particulate matter such as soot and ash. The diesel exhaust then enters a diesel exhaust fluid mixing chamber, wherein diesel exhaust fluid (DEF) is injected into the system. DEF is a pre-mixed fluid composed of about two-thirds pure water and one-third automotive-grade urea. The DEF hydrolyzes into ammonia gas, which then mixes with the diesel exhaust. The diesel exhaust then enters the selective catalytic reduction converter (SCR), wherein the ammonia gas acts as a catalyst and reacts with the nitrogen oxides to form nitrogen and water. Nitrogen and water are natural components of the atmosphere, safe to breath, and are not generally considered to be pollutants.

In one disclosed embodiment, a method of treating exhaust from a diesel engine is disclosed. A stream of untreated exhaust is taken in through an exhaust gas inlet. The untreated exhaust is split into first and second exhaust streams. The first exhaust stream is passed in a first direction through a first DOC and then a first DPF, and the second exhaust stream is passed in the first direction through a second DOC and second DPF, thereby removing particulate matter from the exhaust. Once the first and second exhaust streams have exited the DPFs, they are combined into a third exhaust stream. The third exhaust stream is passed in a second direction, opposite to the first direction, through a first diesel exhaust fluid mixing chamber, wherein DEF is injected into the system. The third exhaust stream then is passed through a second diesel exhaust fluid mixing chamber in a third direction, opposite to the second direction. The DEF hydrolyzes into ammonia. After exiting the second diesel exhaust fluid mixing chamber, the third exhaust stream is split into fourth and fifth exhaust streams. The fourth exhaust stream is passed through a first SCR in a fourth direction opposite the third direction. The fifth exhaust stream is passed through a second SCR in the fourth direction. Within the two SCRs, the ammonia reacts with the nitrogen oxides, resulting in the production of nitrogen and water. Once the fourth and fifth exhaust streams have passed through the SCRs, they are combined into a sixth exhaust stream. The sixth exhaust stream is significantly free of particulate matter and nitrogen oxides, and is therefore safe to be discharged. The sixth exhaust stream passes through a transfer pipe in a fifth direction, opposite the fourth direction, and may then be discharged from the diesel exhaust treatment system via the exhaust gas outlet.

In accordance with one embodiment, a diesel engine exhaust treatment system is disclosed with at least one DOC, at least one DPF, first and second diesel exhaust fluid mixing chambers, at least one SCR, and at least one transfer pipe. An exhaust gas inlet may be coupled to the at least one DOC. The at least one DOC is coupled to the at least one DPF. The at least one DPF is coupled to the first diesel exhaust fluid mixing chamber. The first diesel exhaust fluid mixing chamber is coupled to the second diesel exhaust fluid mixing chamber. The second diesel exhaust fluid mixing chamber is coupled to the at least one SCR. The at least one SCR is coupled to the at least one transfer pipe. The at least one transfer pipe may be coupled to an exhaust outlet.

In accordance with one embodiment, a diesel engine exhaust treatment system is disclosed with a covering for one or more of the exhaust components, which may include at least one DOC and at least one DPF, at least one diesel exhaust fluid mixing chamber of an extended length wherein the exhaust flows in opposite directions while passing through the extended mixing chamber, at least one SCR, and at least one transfer pipe. In a particularly desirable embodiment, two DOCs, two DPFs, two diesel exhaust fluid mixing chambers, and one SCR are located behind a covering, while an additional SCR and the transfer pipe are not covered and are exposed to the atmosphere, thus making them more readily accessible.

In accordance with one embodiment, the system can be mounted to a vehicle. In a preferred embodiment, the vehicle frame elements extend in the lengthwise direction of the vehicle. The system may be mounted to a frame element. In another preferred embodiment, the system is mounted to a frame element so that it is positioned beneath the door of the vehicle. The system may further comprise one or more steps to allow a driver to get in and out of the vehicle more easily.

In accordance with one embodiment, a diesel engine exhaust treatment system includes an exhaust gas inlet, at least one DOC, at least one DPF, first and second diesel exhaust fluid mixing chambers, at least one SCR, at least one transfer pipe, and an exhaust gas outlet. The diesel exhaust enters the system via the exhaust gas inlet, then flows through said diesel particulate filter in a first direction, then through said first diesel exhaust fluid mixing chamber in a second direction different from said first direction, then through the second diesel exhaust fluid mixing chamber in a third direction opposite to said second direction, then through said one SCR converter in a fourth direction opposite to said third direction, and then through said transfer pipe in a fifth direction opposite said fourth direction to the exhaust gas outlet where the diesel exhaust exits the diesel engine exhaust treatment system.

BRIEF DESCRIPTIONS OF THE DRAWINGS

DETAILED DESCRIPTION

The disclosure proceeds with reference to a number of illustrative embodiments, which should not be construed as limiting but instead as being exemplary embodiments. The invention includes all novel and non-obvious methods, features, and systems set forth herein, both alone and in any and all possible combinations and sub-combinations with each other.

Figure 1:
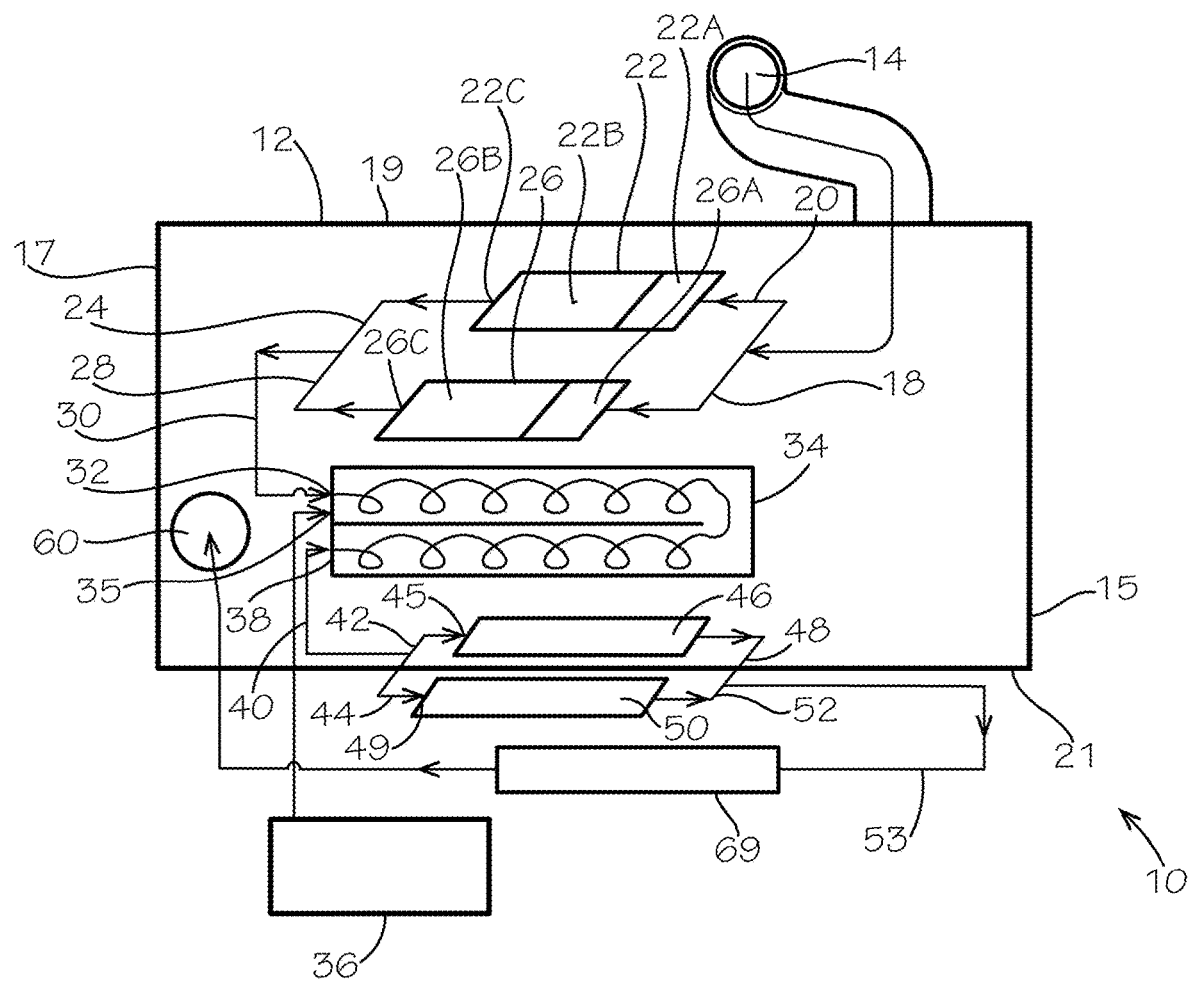
FIG. 1 is a schematic illustration of one exemplary embodiment of a diesel engine exhaust treatment system.

FIG. 1 is a schematic of an exemplary embodiment of a diesel engine exhaust treatment system 10. The illustrated system 10 as shown includes an exhaust gas inlet 14, an exhaust gas outlet 60, and a number of exhaust treatment components. The exhaust treatment components enable a flow path between the exhaust gas inlet 14 and exhaust gas outlet 60. In the illustrated system 10, certain exhaust treatment components are protected by a covering 12. The components shown within the covering 12 are two DPFs 22B, 26B, two DOCs 22A, 26A, a diesel exhaust fluid mixing chamber 34, and a single SCR 46. The components outside of the covering 12 include a single SCR 50 and a transfer pipe 69. It is therefore to be understood that the disclosed system 10 provides for a number of components to be free of the covering 12 and thus more readily accessible.

The diesel engine exhaust treatment system 10 is capable of treating exhaust gas from a diesel engine, including that of a heavy duty truck. In an exemplary method, exhaust gas from a diesel engine is delivered to the exhaust gas inlet 14. The exhaust gas enters the exhaust gas inlet 14 and is then split into two streams of exhaust gas 18, 20. The two streams 18, 20 then enter the inlets of the two DOCs 22A, 26A, wherein the hydrocarbons and carbon monoxide are catalytically oxidized to form carbon dioxide and water. The streams then pass through the DPFs 22B, 26B, where particulate matter, such as soot and ash, are trapped and removed from the exhaust gas streams. In this embodiment, the DOCs 22A, 26A and DPFs 22B, 26B are in parallel with each other. In alternative embodiments, there may be one DPF and one DOC. In other alternative embodiments, there may be more than two DPFs and two DOCs. However, two DPFs and two DOCs are sufficient for purposes of the present disclosure.

Diesel particulate filters are used to filter out particulate matter created by diesel engines. Diesel engines create particulate matter, such as soot and ash, due to the incomplete combustion of the fuel-air mixture within the engine. In general, older engines are known to create a greater amount of particulate matter. Similarly, two-stroke diesel engines are generally known to produce even more particulate than four-stroke diesel engines. A DPF is generally capable of removing approximately 85% (or more) of the soot and ash from the exhaust gas. An example of a DPF is a cordierite wall flow filter, but other forms of DPFs may be used in the invention. The DPF may preferably be preceded by a diesel oxidation catalyst converter (DOC). A DOC typically contains palladium platinum, and aluminium oxide, all of which catalytically oxidize the hydrocarbons and carbon monoxide found within the exhaust gas with oxygen, forming carbon dioxide and water. This process helps eliminate diesel odor and reduce soot. The system in FIG. 1 includes two DPFs 22B, 26B, each of which is preceded by a DOC 22A, 26A. The use of two DPFs and two DOCs is preferred over the use of a single DPF and DOC, as the total cross-sectional area through which the exhaust gas flows is increased. The increased cross-sectional area, and more specifically the use of two DPFs and two DOCs, creates less back pressure than if a single lane of similar volume was used in the diesel engine exhaust treatment system 10.

Two streams of filtered exhaust 24, 28 exit the DPFs 22B, 26B through an outlet 22C, 26C and thereafter combine to form a single stream 30. The single exhaust stream 30 then enters an inlet 32 of the diesel exhaust fluid mixing chamber 34. The diesel exhaust fluid mixing chamber 34 includes an injection system that injects a urea solution, also referred to as diesel exhaust fluid (DEF), into the exhaust. A common urea solution is composed of around ⅓ urea and ⅔ water. The urea solution is stored in a storage unit 36, such as a urea solution tank. The storage unit 36 is in fluid connection with an injector 35, which is connected to the inside of the diesel exhaust fluid mixing chamber 34. In a preferred embodiment, the injection point of the urea solution is at the upstream end of the diesel exhaust fluid mixing chamber 34. Upon injection, the urea undergoes thermal decomposition and hydrolysis, resulting in ammonia. In alternative embodiments, the injector may supply ammonia to the exhaust stream. However, the urea solution is preferable as it is safer to store and is commonly available at truck stops and gas stations. The amount of urea solution or ammonia can be controlled via sensors (not shown) that determine the nitrous oxide levels in the exhaust stream after exiting the DPFs 22B, 26B, but before entering the diesel exhaust fluid mixing chamber 34. The urea solution or ammonia mixes with the exhaust, becoming generally evenly distributed. In FIG. 1, there is a single diesel exhaust fluid mixing chamber 34, that extends from one end of the system to the opposite end, and then doubles back to the first end. In another embodiment, there may be two diesel exhaust fluid mixing chambers where the exhaust stream flows from a first diesel exhaust fluid mixing chamber to a second diesel exhaust fluid mixing chamber. The use of two diesel exhaust fluid mixing chambers or a single diesel exhaust fluid mixing chamber that doubles back on itself allows for increased urea vaporization compared to diesel exhaust fluid mixing chambers of shorter lengths.

The stream of exhaust gas containing ammonia 40 exits the diesel exhaust fluid mixing chamber 34 via an outlet 38 and splits into two streams 42, 44. The two streams 42, 44 enter into two SCRs 46, 50 via SCR inlets 45, 49. An SCR is known to those of ordinary skill to convert nitrogen oxides into diatomic nitrogen and water. An SCR utilizes a catalyst which reacts with the nitrogen oxides and ammonia within the exhaust stream as the exhaust streams 42, 44 pass through the catalyst chamber 46, 50. SCR catalysts are generally comprised of a substrate and a wash coat. The substrate is composed of cordierite. The wash coat is a non-active carrier and active catalytic components. The non-active carrier is often made from ceramic materials such as titanium oxide (or evident). The active catalytic components are typically a precious metal, zeolites, or an oxide of a base metal, such as vanadium, molybdenum and tungsten. The SCR catalysts are generally shaped as a honeycomb or a plate, but for automotive applications the use of extruded honeycomb components is preferred. In FIG. 1, two SCRs 46, 50 are shown in parallel. In alternative embodiments, additional SCRs may be utilized, but two SCRs is generally sufficient to reduce pollutants below EPA mandated limits. The use of two SCRs is preferred over the use of a single SCR, as the total cross-sectional area through which the exhaust gas flows is increased. The increased cross-sectional area reduces back pressure through the diesel engine exhaust treatment system, maintaining increased fuel efficiency.

In FIG. 1, the illustrated embodiment has a partial covering 12 with first and second end walls 15, 17, a top wall 19, and a bottom wall 21. In the embodiment shown, two DOCs 22A, 26A, two DPFs 22B, 26B, one diesel exhaust fluid mixing chambers 34, and one SCR 46 are covered by the partial covering 12, while one SCR 50 and the transfer pipe 69 are not. The SCR 50 and transfer pipe 69 are located outside of the covering 12 and arranged in parallel with the rest of the components.

In FIG. 1, the illustrated embodiment of the diesel engine exhaust treatment system 10 has an exhaust flow path that operates in five directions. In the system shown, the exhaust gas enters the system through the exhaust gas inlet 14 adjacent to the first end wall 15. The exhaust gas is split into two streams 18, 20, which both flow through the DOCs 22A, 26A and then the DPFs 22B, 26B in a first direction. Upon exit, the two streams 18, 20 have been treated by the DOCs 22A, 26A and DPFs 22B, 26B and thus become streams 24, 28, which combine to form stream 30, which then flows into the diesel exhaust fluid mixing chamber 34. The stream 30 flows through the mixing chamber 34 in a second direction, opposite the first direction, before turning back and flowing in a third direction, opposite the second direction. In alternative embodiments that utilize two diesel exhaust fluid mixing chambers, the exhaust stream would flow through a first mixing chamber in a second direction, opposite the first direction, and then would flow through the second mixing chamber in a third direction, opposite the second direction. Upon exiting from the mixing chamber 34, the stream 40 splits into streams 42, 44 which pass through the SCRs 46, 50 in a fourth direction, opposite the third direction. Upon exiting from their respective SCRs 46, 50, the streams 48, 52 combine into a stream 53 which passes through a transfer pipe 69 in a fifth direction, opposite the fourth direction, and exits the exhaust gas outlet 60.

In order to maintain suitable temperatures throughout the diesel engine exhaust treatment system 10 and the diesel treatment components within the system, insulating matting can be utilized to aid in containing heat within the system and the components, resulting in higher internal temperatures, for example, within the SCRs 46, 50, DOCs 22A, 26A and DPFs 22B, 26B, which can increase their effectiveness in removing pollutants from the exhaust. The covering 12 can aid in retaining heat, but only for components that are sufficiently shielded. The SCR 50 is not shielded, and thus the SCR 50 is preferably insulated with matting or an alternative insulating material. This allows for minimal heat loss in the externally located SCR 50, therefore maintaining high efficiency for the internal catalytic reduction process. If more than one SCR is exposed to the atmosphere, or an alternative component such as a DOC or DPF, such other exposed components may also be insulated with matting or an alternative insulating material.

Because the SCR 50 is not covered, this allows for easier access to the SCR 50 for inspection and replacement of the SCR catalyst. SCR catalysts generally have a finite life due to their porous construction, as they become plugged or contaminated from urea or other unwanted deposits such as biuret. For example, ammonia sulfur compounds, ammonium bisulfate, and silicon compounds, all of which may potentially plug an SCR catalyst. Additionally, exhaust gas may contain certain poisons or other unwanted substances which will destroy the chemistry of the catalyst and render the SCR ineffective at reducing nitrogen oxide, and potentially creating more nitrogen oxide through the oxidation of ammonia. These substances may include, but are not limited to, sulfur, halogens, alkaline metals, arsenic, phosphorus, antimony, and chrome. By exposing at least one of the SCRs 50 so that it is not covered, its SCR catalyst can be more easily accessed for inspection, and the inspected status of the externally located SCR catalyst is informative of the status of the SCR 46 located within the partial covering 12. Therefore, the status of both SCR catalysts may be more easily determined.

Figure 2:
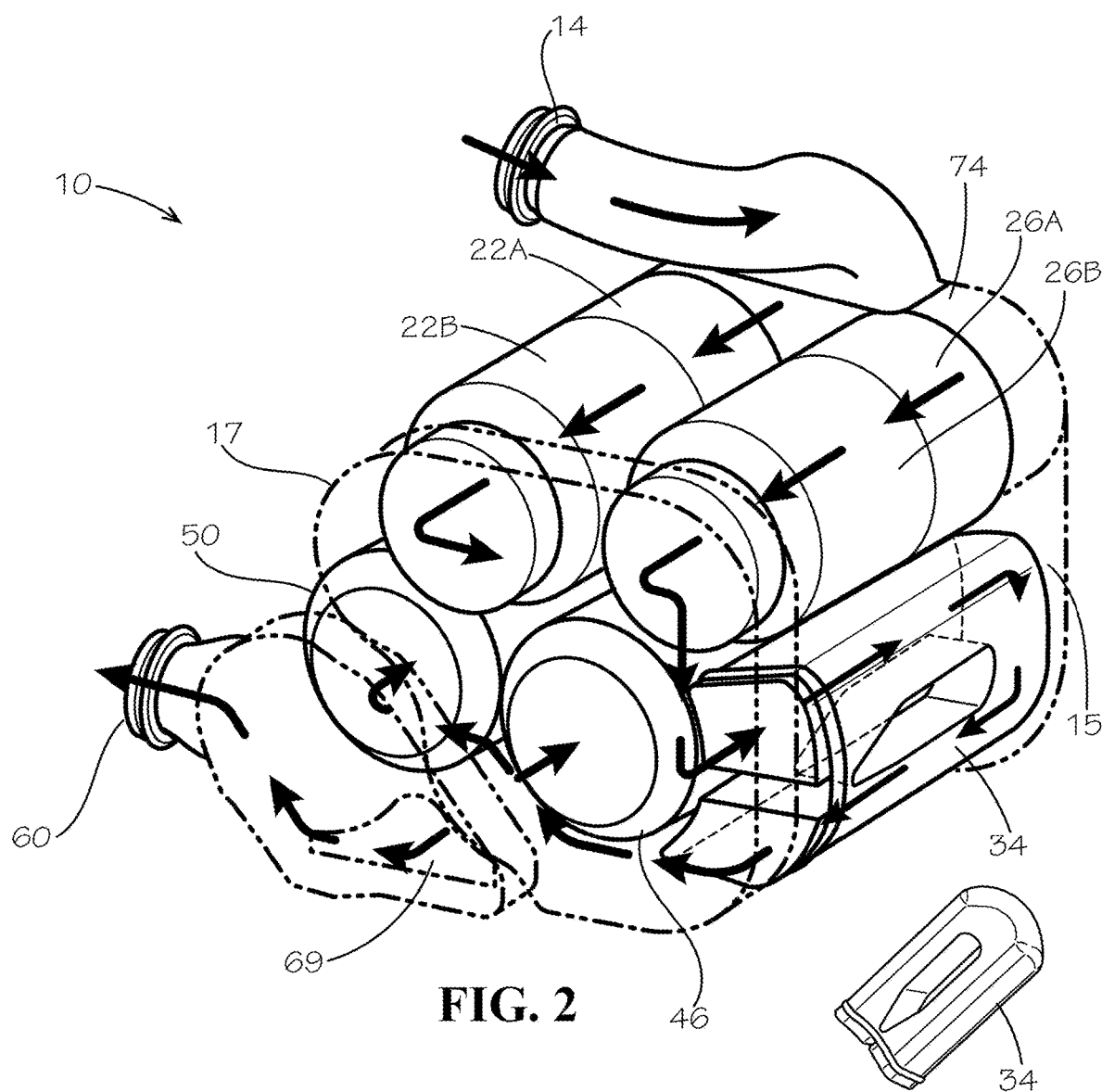
FIG. 2 is a perspective view of an exemplary system in accordance with the present disclosure.

FIG. 2 is an exemplary embodiment of the diesel engine exhaust treatment system 10 described in FIG. 1. Certain elements of the system 10 are not shown in FIG. 2 in order to illustrate the internal components and the exhaust flow path. FIG. 2 illustrates the flow path of the exhaust gas through the system 10. The exhaust gas enters the system 10 via the exhaust gas inlet 14, and then enters a first stream splitting chamber 74, where the exhaust gas is split into two streams 18, 20. The two streams 18, 20 flow through the DOCs 22A, 26A, respectively, and then DPFs 22B, 26B, respectively, in a first direction. The streams 24, 28 enter a first common chamber 72 where the streams 24, 28 combine into stream 30, which then enters the diesel exhaust fluid mixing chamber 34, wherein the exhaust gas flows in a second direction and then turns back and returns in a third direction. The exhaust gas exits the diesel exhaust fluid mixing chamber 34 in a stream 40, which enters the second stream splitting chamber 75 where it then splits into streams 42, 44, which enter the two SCRs 46, 50 and flow in a fourth direction. The exhaust gas exits the SCRs 46, 50 in two streams 48, 52 and combines into a stream 53 in a second common chamber 73 and then enters the transfer pipe 69, wherein the exhaust gas flows in a fifth direction. The treated exhaust gas 52 exits through the exhaust gas outlet 60.

In alternative embodiments, the streams may not be combined prior to entering the diesel exhaust fluid mixing chamber 34. Instead, each DPF 22B, 26B has a separate fluid connection from its DPF outlet to an inlet of the diesel exhaust fluid mixing chamber 34. The two streams may combine in the diesel exhaust fluid mixing chamber 34. Similarly, alternative embodiments may have two transfer pipes, and therefore the two streams do not recombine in a second common chamber after exiting the SCRs 46, 50, but instead would recombine when they flow through the exhaust gas outlet 60 and exit the system 10.

Figure 3:
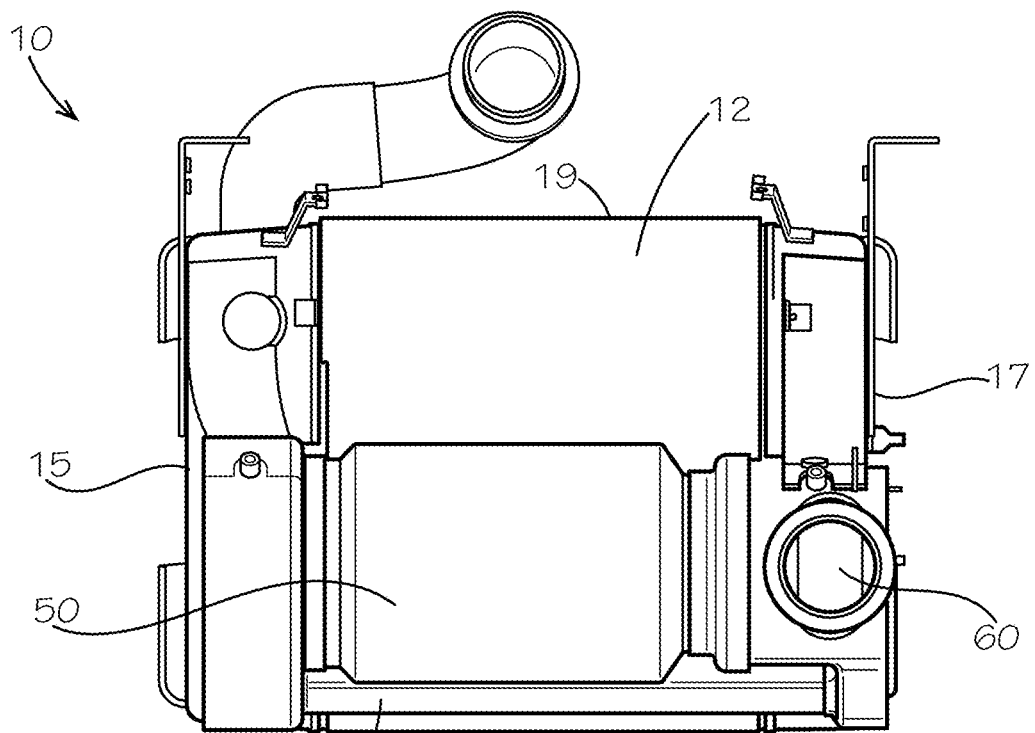
FIG. 3 is a front view of the system of FIG. 2.

In FIGS. 3-6, an exemplary embodiment of the diesel engine exhaust treatment system 10 is shown. FIG. 3 is a view of the system 10, and illustrates the second SCR 50 and transfer pipe 69 as being located external to the covering 12. The covering 12 is shown to be comprised of two end walls 15, 17, a top wall 19, and a bottom wall 21 that are configured to protect the components covered thereby. It will be appreciated that the end walls serve as the sides of the disclosed system 10.

FIG. 3 is a front view of an exemplary embodiment of the system 10 that shows the partial covering 12 and an exposed SCR 50. The covering 12 extends partially across the system 10, but does not cover the SCR 50 or the transfer pipe 69. It is to be understood that the exposed SCR 50 sits and extends further in the direction of the outlet 60 than other components, which may facilitate securing of the system in a convenient location beneath the door of a diesel truck cab. FIG. 3 also shows end walls 15 and 17.

Figure 4:
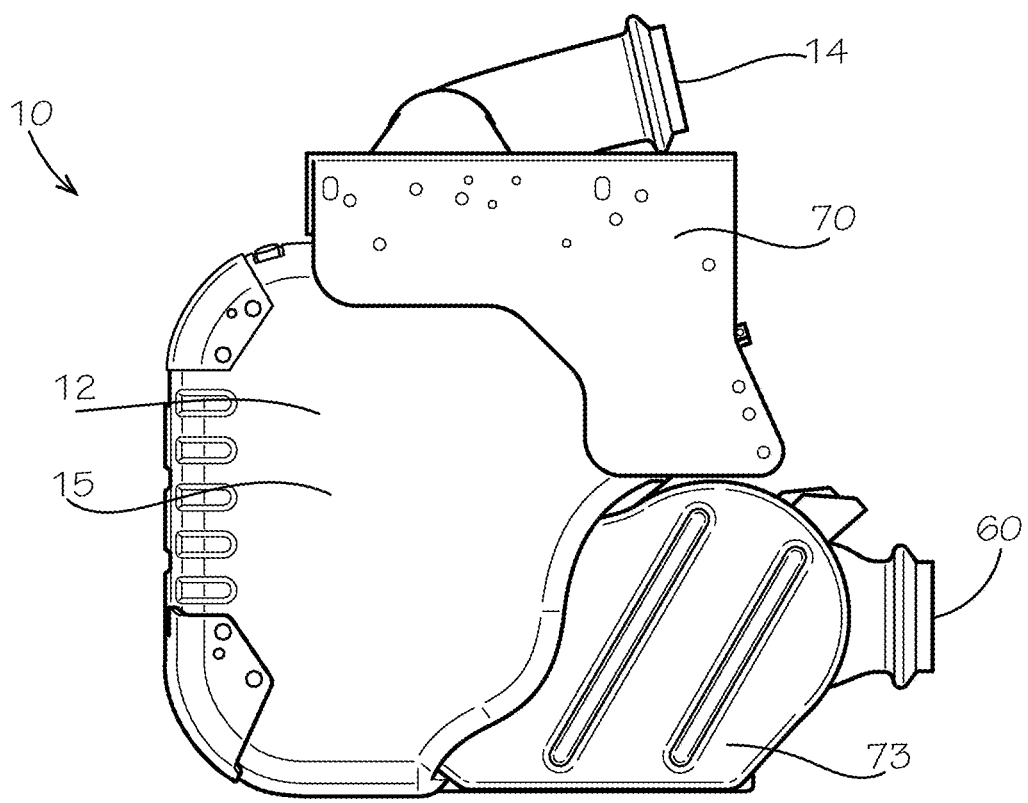
FIG. 4 is a side view of the system of FIG. 2.

FIG. 4 is an end view of the diesel engine exhaust treatment system 10 shown in FIGS. 2-3. The first end wall 15 covers the exhaust treatment components except for the exposed SCR 50 and transfer pipe 69. A mounting bracket 70, is coupled to the first end wall 15. The mounting bracket 70 attaches to a frame rail of the vehicle. In the embodiment illustrated in FIG. 4, a frame element may be positioned above the SCR 50 located external to the covering 12 of the system 10. In alternative embodiments, the frame rail would not be positioned above any portion of the system 10.

Figure 5:
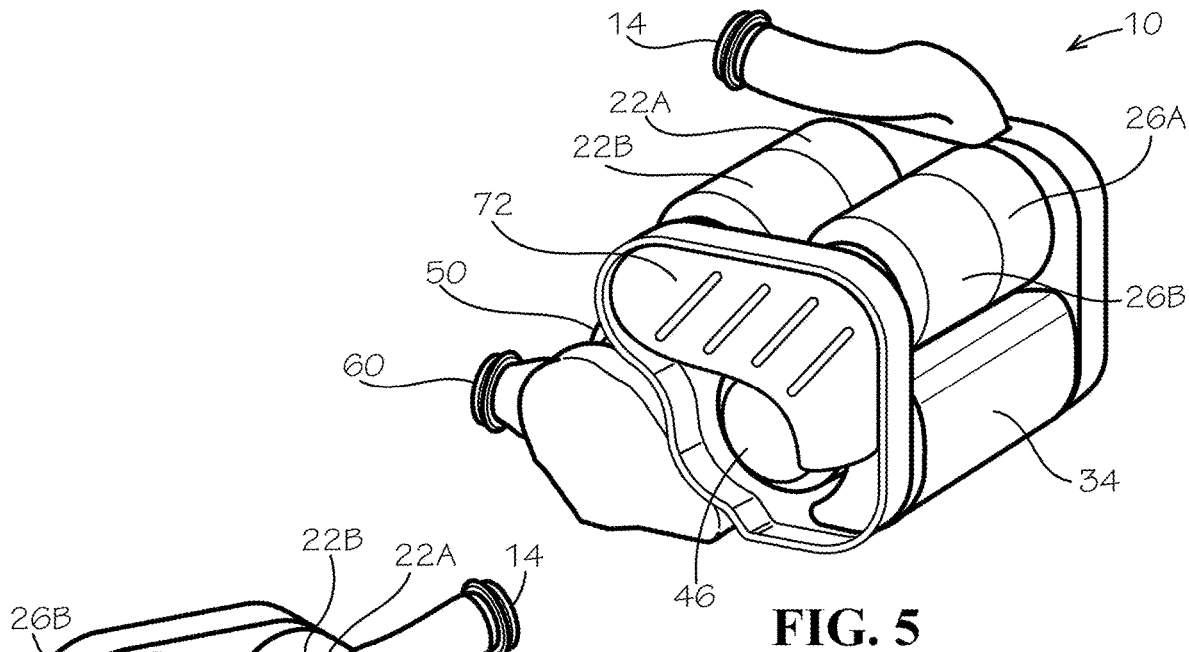
FIG. 5 is a perspective view of the system of FIG. 2 with certain components to show exemplary components.
Figure 6:
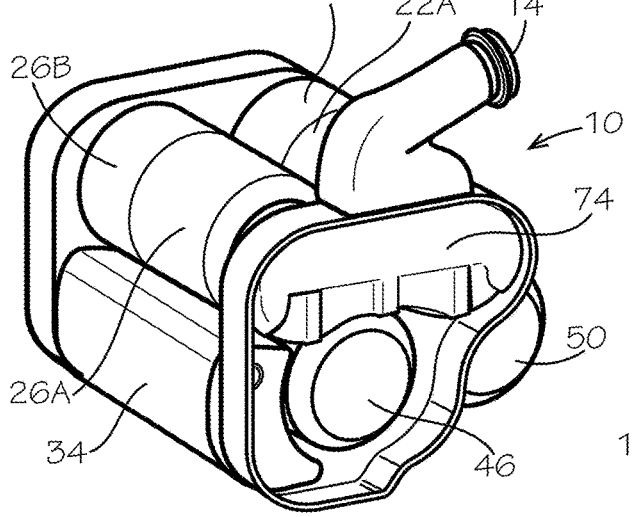
FIG. 6 is a perspective view of the system of FIG. 2 with certain components removed to show exemplary components.

FIGS. 5-6 illustrate the same exemplary embodiment shown in FIGS. 2-4. In FIG. 5, the top 19, bottom 21, and end (or side) walls 15, 17 have been removed in order to show the components that are within the covering 12. In the shown embodiment, the enclosed components include two DOCs 22A, 26A, two DPFs 22B, 26B, a diesel exhaust fluid mixing chambers 34, and one SCR 46. Additionally shown is the second SCR 50, which is not covered by the covering 12. The person of ordinary skill will recognize that all of the components are arranged in parallel. A first common chamber 72 is shown in fluid connection with the two DPFs 22B, 26B and the inlet of the diesel exhaust fluid mixing chamber 34. The first common chamber 72 allows the two streams of exhaust gas 24, 28 exiting the two DPFs 22B, 26B to combine into a single stream of exhaust gas 30 before entering the diesel exhaust fluid mixing chamber 34. A second common chamber 73, analogous to the first chamber 72 fluidly connects the two SCRs 46, 50 with the transfer pipe 69, allowing the two streams exiting the two SCRs 46, 50 to combine into a stream 52 before entering the transfer pipe 69.

In FIG. 6, the stream splitting chamber 74 is shown fluidly connecting the exhaust gas inlet 14 with the two DOCs 22A, 26A. The single stream of exhaust gas from the exhaust gas inlet 14 flows into the first stream splitting chamber 74, where the exhaust gas splits into two streams 18, 20 and each newly formed stream flows into one of the DOCs 22A, 26A. A second stream splitting chamber 75, analogous to the first stream splitting chamber 74 is not shown, but it fluidly connects the outlet of the diesel exhaust fluid mixing chamber 34 with the inlet of the two SCRs 46, 50, wherein the single stream of exhaust gas that exits the mixing chamber 34 splits into two streams 42, 44 that flow into the SCRs 46, 50.

Figure 7:
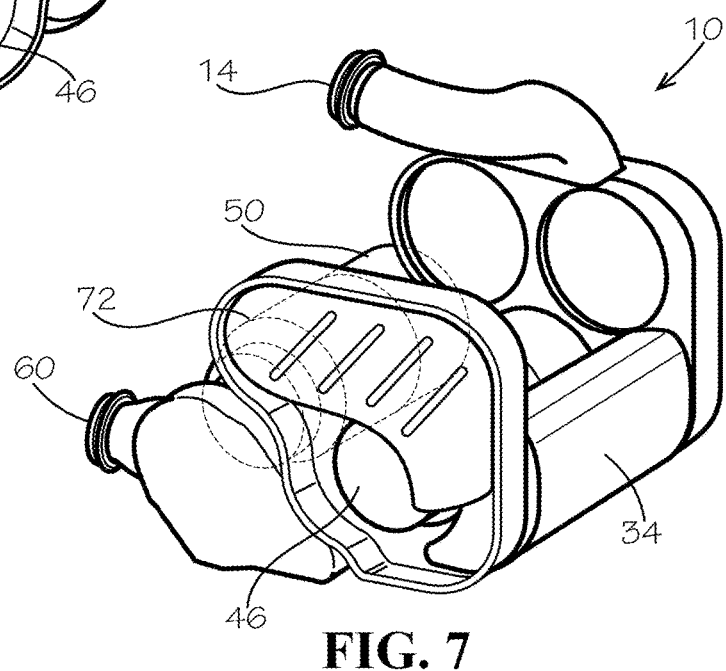
FIG. 7 is a perspective view of the system of FIG. 2 with certain components removed or shown in phantom to show exemplary components.

In FIG. 7, the DOCs 22A, 26A and DPFs 22B, 26B have been removed in order to show the arrangement of the two SCRs 46, 50. One SCR 46 is located within the covering 12, while the other SCR 50 is located outside of the covering 12, allowing for easier and quicker access in order to inspect the SCR catalyst within the SCR 50. The mixing chamber 34 is further shown as in fluid communications with the SCRs 46, 50 (50 is shown in phantom) as the stream 40 exits the mixing chamber and splits into streams 42, 44 for delivery to their respective SCRs.

Figure 8:
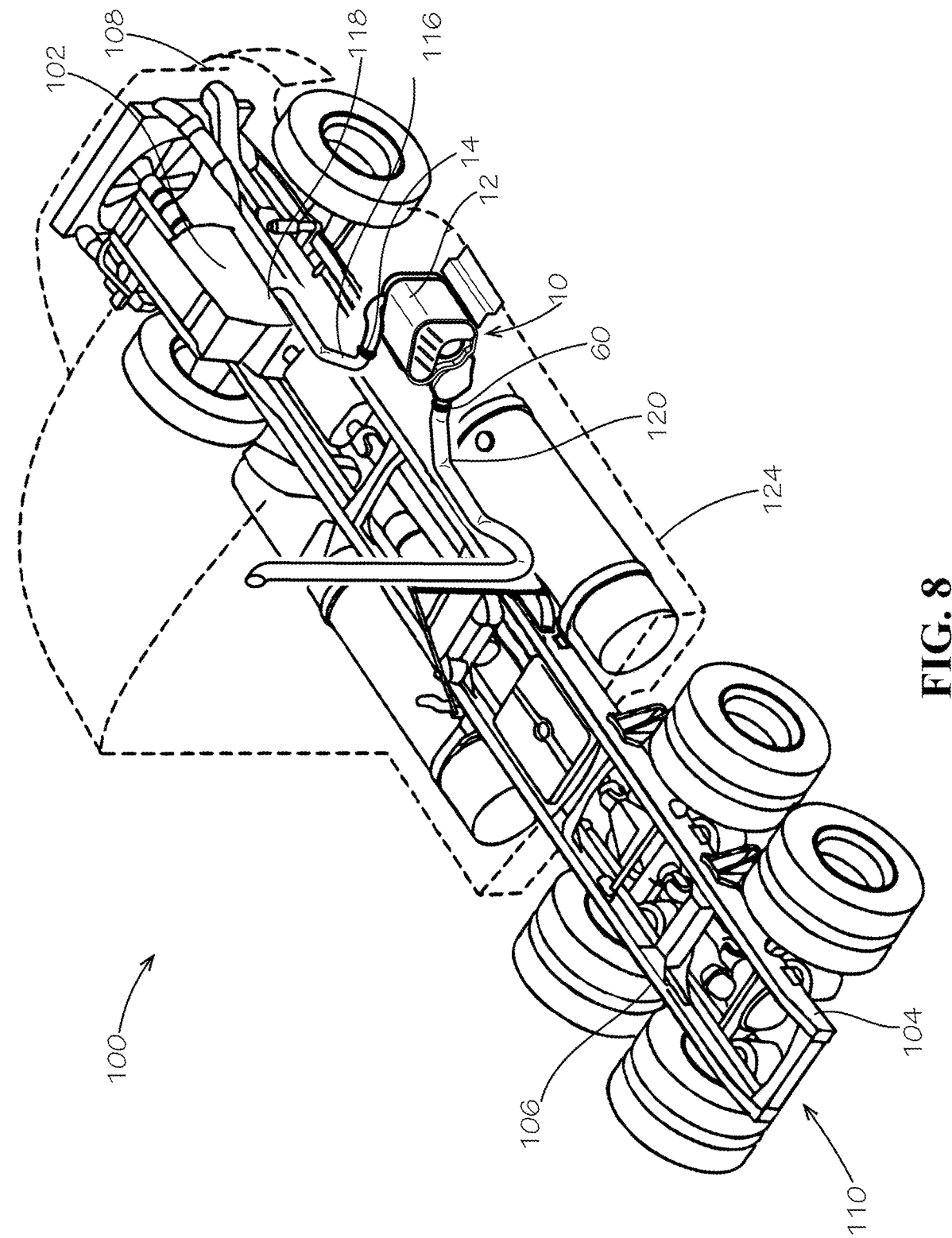
FIG. 8 and FIG. 9 are schematic illustrations of a diesel land vehicle, namely—a diesel truck cab.
Figure 9:
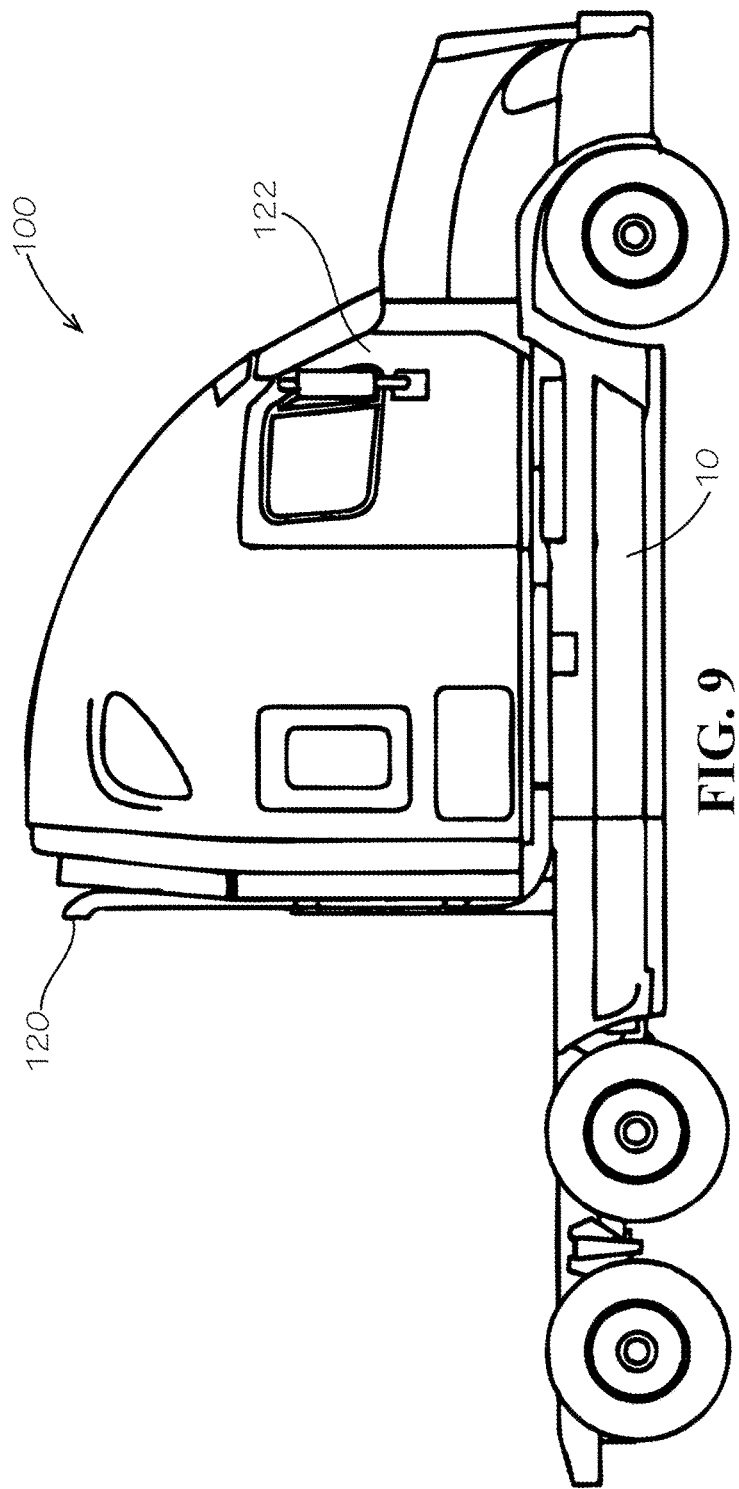
Figure 10:
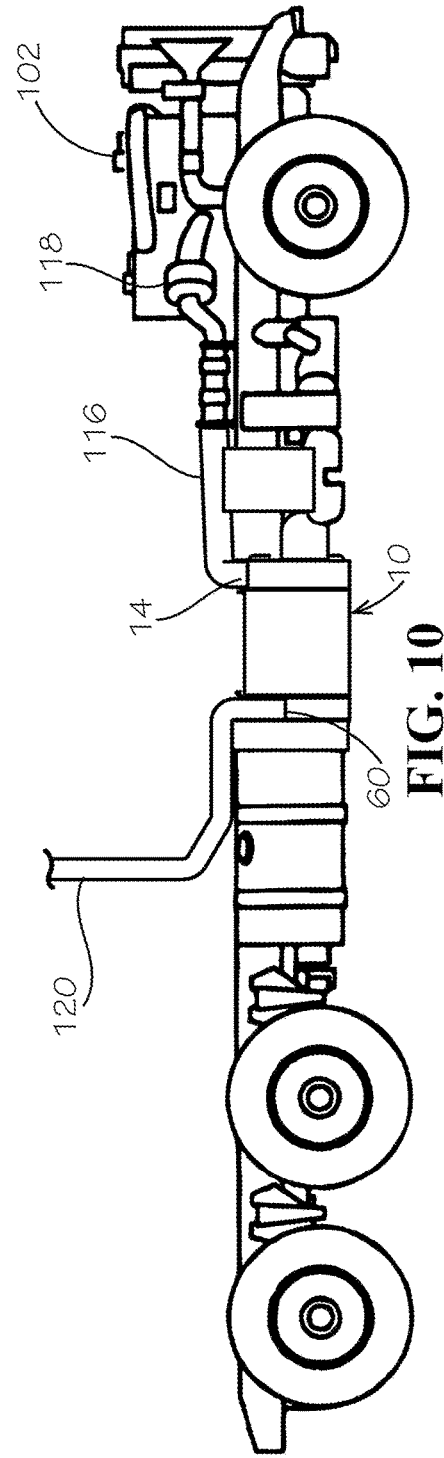
FIG. 10 illustrates a diesel engine exhaust treatment system in accordance with the disclosure located adjacent a door of a diesel truck with steps included for the purpose of climbing into and out of the truck.

FIGS. 8-10 illustrate a truck 100 for use with a trailer (not shown). The truck includes a diesel engine 102, and frame elements extending lengthwise from generally the front of the truck 108 to the back of the truck 110. The frame elements include rails 104, 106 that are preferably parallel to each other. Alternative embodiments can have three or more frame rails, and/or the frame rails may not be in parallel with each other. The diesel engine exhaust treatment system 10 is coupled to a frame rail, preferably the frame rail nearest the driver-side door. The diesel engine exhaust treatment system 10 and frame rail are coupled to each other via the mounting bracket 70, such as mounting brackets that attach to the frame rail and to the covering 12 of the system 10 in a conventional manner. In the embodiment shown in FIGS. 8-10, the exposed SCR 50 not behind the covering 12 and is positioned partially under the frame rail 104 such that a portion of the covering 12 is positioned outside of the frame rail's 104 vertical plane, towards the side 124 of the truck 100. An engine exhaust outlet pipe 116 from the diesel engine 102 is attached to the exhaust gas inlet 14, providing fluid connection between the diesel engine's exhaust outlet 118 and the diesel engine exhaust treatment system 10. Once the exhaust gas flows from the diesel engine 102 into the diesel engine exhaust treatment system 10, the exhaust gas is treated by at least one DOC, at least one DPF, at least one diesel fluid mixing chamber, and at least one SCR before exiting the system 10. It is preferred that the exhaust gas is treated by a system 10 as described in FIG. 1. The treated exhaust gas exits the diesel engine exhaust treatment system 10 through the exhaust gas outlet 60, which is coupled to an exhaust pipe 120. The exhaust pipe 120 expels the treated exhaust gas into the atmosphere.

FIGS. 9-10 illustrate an embodiment of the diesel engine exhaust treatment system 10 as mounted on the truck 100. In this embodiment, the diesel engine exhaust treatment system 10 is positioned to the rear of the truck cab door 122. In alternative embodiments, the system 10 is positioned directly beneath the truck cab door 122. FIG. 10 is an illustrated view of the truck 100 and diesel engine exhaust treatment system 10 with portions of the truck 100 removed in order to see the system 10. Exhaust gas from the diesel engine 102 flows into the diesel engine exhaust treatment system 10 via an engine exhaust outlet pipe 116 connected to the exhaust gas inlet 14. The exhaust gas passes through the various treatment components within the system 10, as for example described in reference FIG. 1. The treated exhaust gas exits the system 10 via the exhaust gas outlet 60 which is connected to an exhaust pipe 120. The exhaust pipe 120 expels the treated exhaust gas into the atmosphere.

Figure 11:
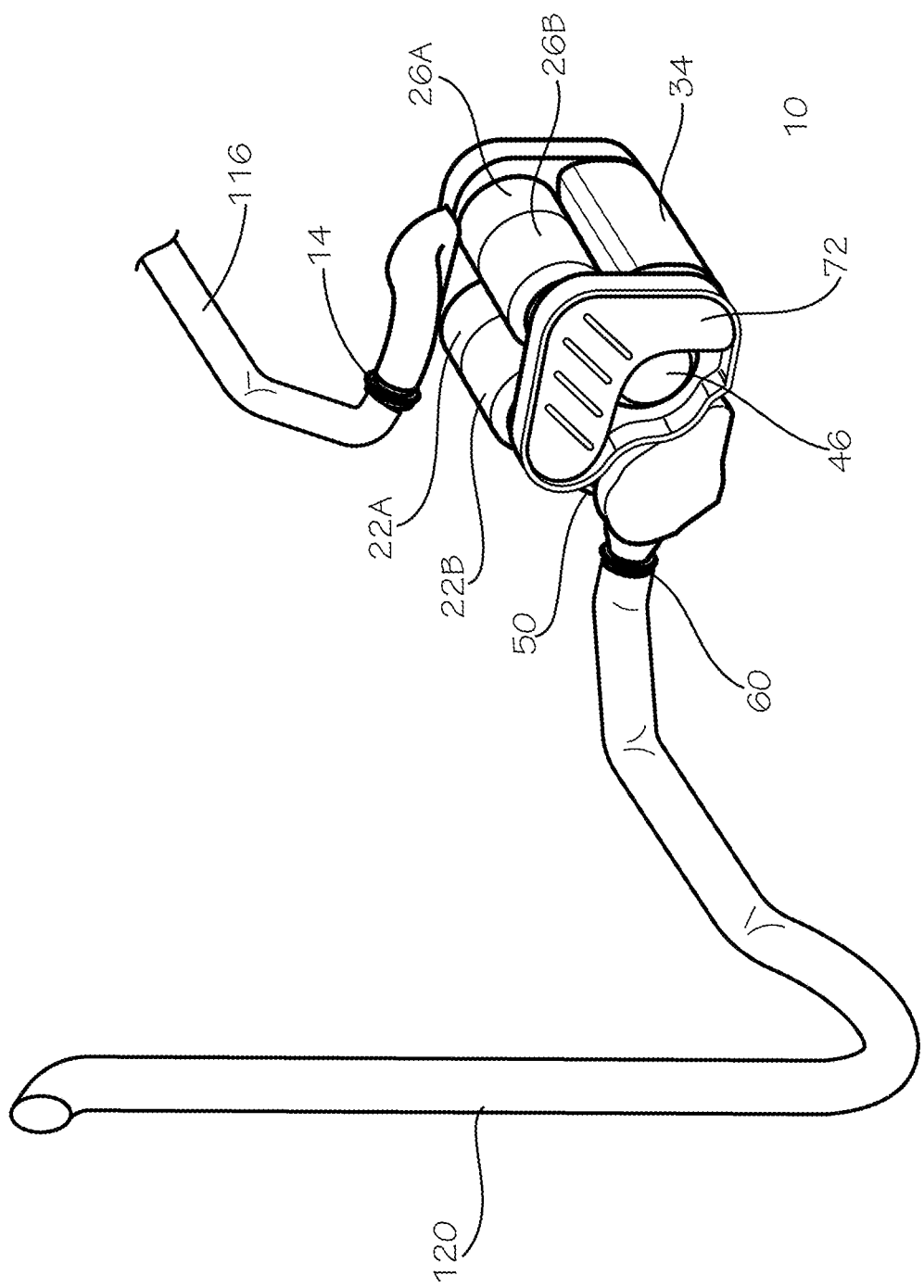
FIG. 11 is an exemplary embodiment of a diesel engine exhaust treatment system connected to the exhaust gas piping of a vehicle.

FIG. 11 illustrates an embodiment of the diesel engine exhaust treatment system 10 and its connection to the truck's 100 exhaust system. The exhaust gas inlet 14 is coupled to the engine exhaust outlet pipe 116 in a conventional manner. The exhaust gas outlet 60 is coupled to the exhaust pipe 120 in a conventional manner. In the embodiment shown, the exhaust gas inlet 14 is located towards the end of the system 10 located nearest the front of the truck 108, while the exhaust gas outlet 60 is located on the opposite end of the system 10. In alternative embodiments, the exhaust gas inlet 14 and outlet 60 may be located on the same end of the system 10. The person of ordinary skill will appreciate that such alternative embodiments would not require a transfer pipe 69.

Figure 12:
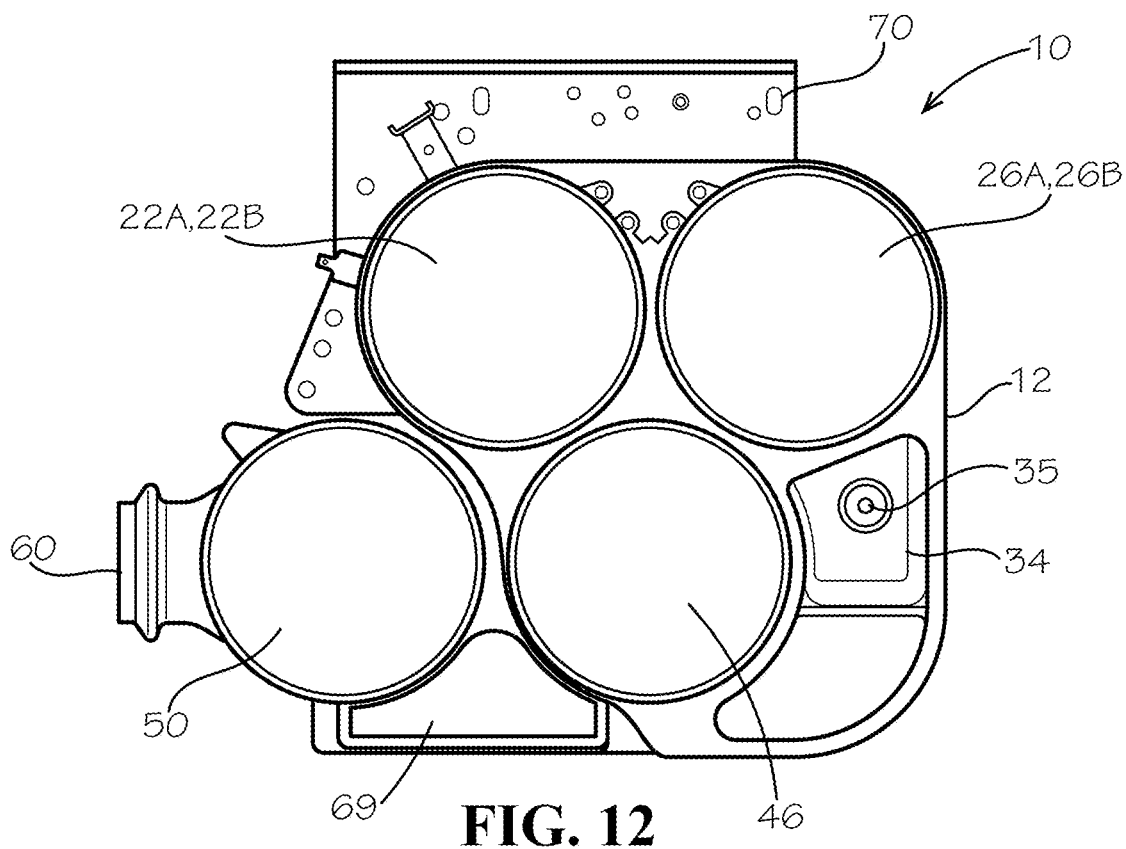
FIG. 12 is a side view of an exemplary embodiment.

FIG. 12 is a schematic of a cross-section of the exemplary diesel engine exhaust treatment system 10 illustrated in FIGS. 2-7. The DOCs 22A, 26A, DPFs 22B, 26B, diesel exhaust fluid mixing chamber 34, SCRs 46, 50, transfer pipe 69, and partial covering 12 are shown in the same positions as they are in FIGS. 2-7. The positioning of the components allows for a compact system. For example, in one embodiment, the system 10 may have a height of 837 millimeters and width of 818.5 millimeters. The overall length of this exemplary system 10 may be 902 millimeters. Alternative embodiments may have different dimensions, based on the use of more or less exhaust gas treatment components, or components with different cross-sectional areas or lengths. The use of insulating materials will increase the overall dimensions of the system 10.

Figure 13:
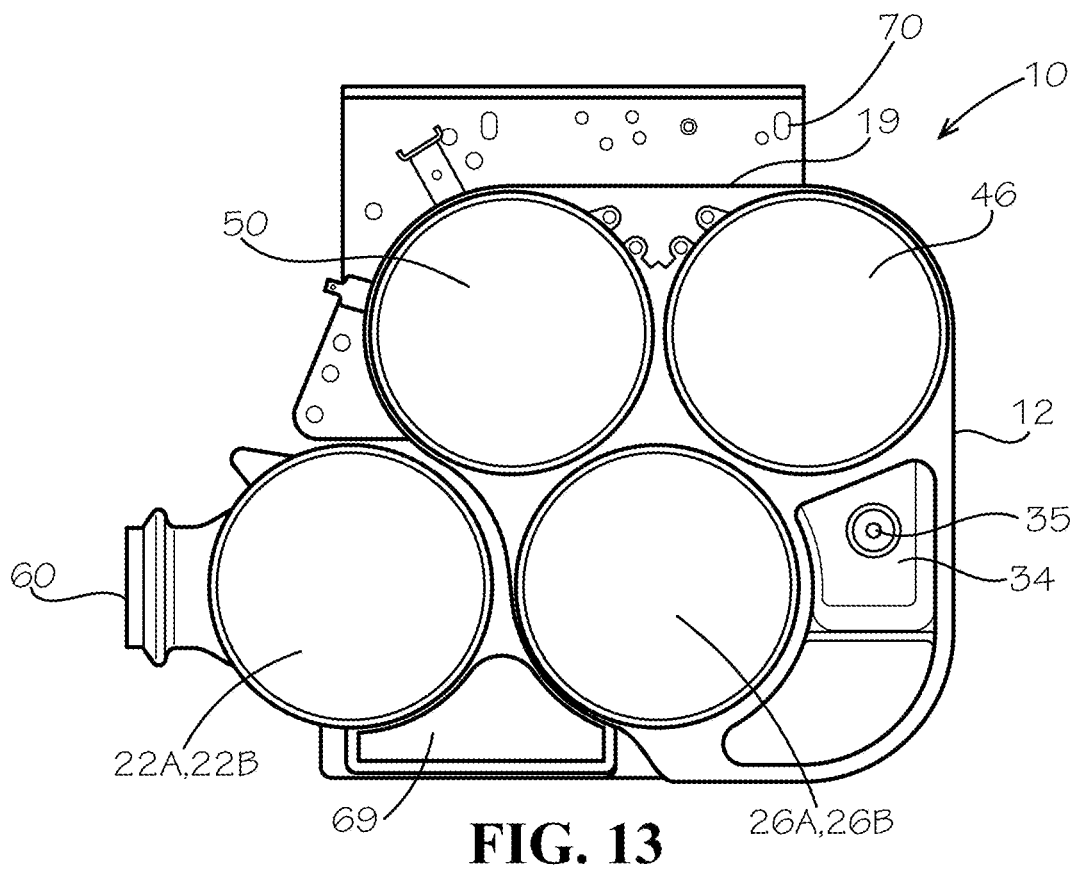
FIG. 13 is a side view of another exemplary embodiment.
Figure 14:
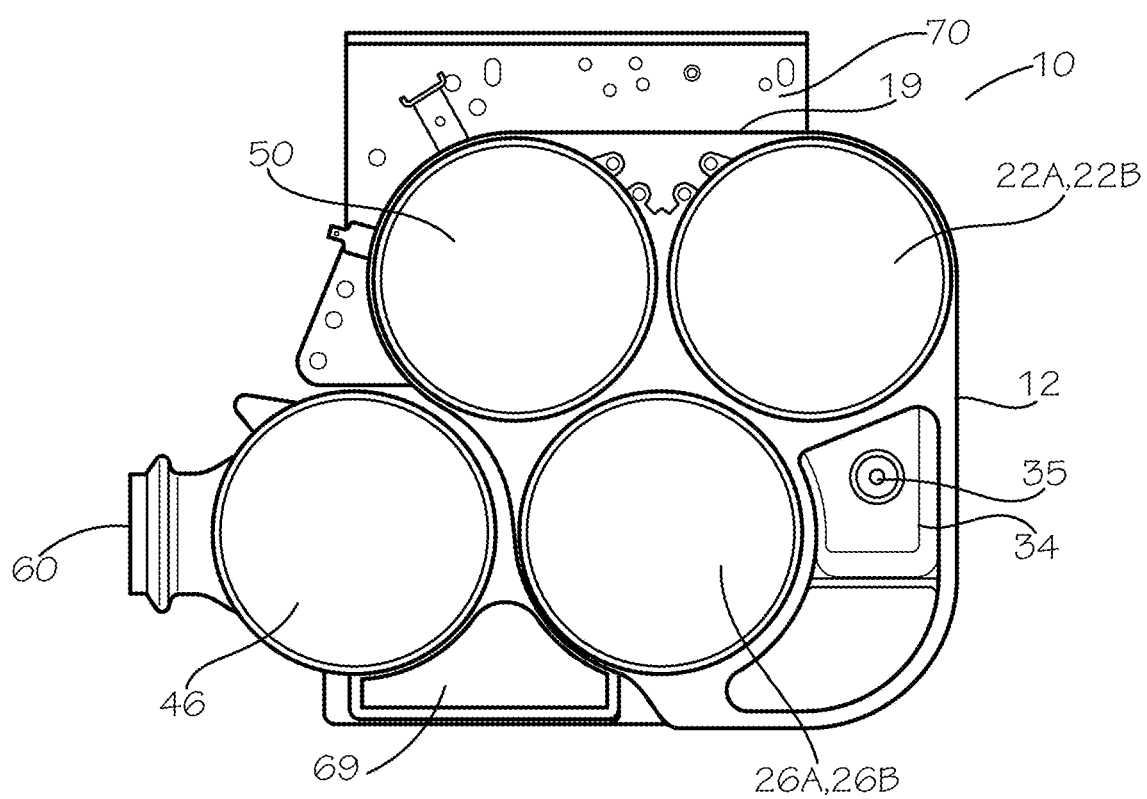
FIG. 14 is a side view of another exemplary embodiment.

FIGS. 13 and 14 are similar cross-section views that illustrate alternative arrangements of DOCs 22A, 26A, DPFs 22B, 26B and SCRs 46, 50, as compared to the arrangement shown in FIG. 12. In alternative embodiments, the diesel exhaust fluid mixing chamber 34 may be positioned differently. As shown, these figures illustrate the DOCs 22A, 26A, the DPFs 22B, 26B, the mixing chamber 34, the SCRs 46, 50 and the transfer pipe 69. As described herein, these components cooperate to treat the diesel exhaust and remove pollutants therefrom. FIG. 13 illustrates an embodiment of the system 10 where the two SCRs 46, 50 are positioned adjacent to the top wall 19, above the two DOCs 22A, 26A, two DPFs 22B, 26B, and the diesel exhaust fluid mixing chamber 34. One DOC 22A, one DPF 22B, and the transfer pipe 69 are located external to the covering 12, while the other components are within the covering 12. FIG. 14 illustrates an additional embodiment of the system 10 where one SCR 50, one DOC 22A, and one DPF 22B are positioned adjacent to the top wall 19, above the SCR 46, DOC 26A, DPF 26B, and the diesel fluid exhaust mixing chamber 34. One SCR 46 and the transfer pipe 69 are located external to the covering 12, while the other components are within the covering 12.

The disclosed system 10 provides for various arrangements of the exhaust treatment components, allowing for the various components to be located externally to the covering 12 and therefore readily accessible. A person of ordinary skill in the art will appreciate that the various alternative arrangements of the exhaust treatment components will necessitate corresponding alternative arrangements of the stream splitting chambers 72, 74 and common chambers 73, 75. It is to be understood that the arrangement and operation of these components effectively utilize available space for placement on a diesel truck and to process the diesel exhaust in a manner that reduces back pressure. More particularly, the components shown are preferably provided in parallel such that the effective back pressure may be less than what could typically be experienced by catalysts of the same volume in a single lane arrangement. Further, the disclosed system 10 is capable of maintaining an effective flow of exhaust gas and ammonia and/or urea fluid even after the exhaust flow is split into streams 42, 44 before entering the SCRs 46, 50. It will further be understood by the person of ordinary skill that added length of the mixing chamber 34 (as, for example, by a two-fold extension as the exhaust travels in the second and third directions) allows for enhanced urea vaporization.

Figure 15:
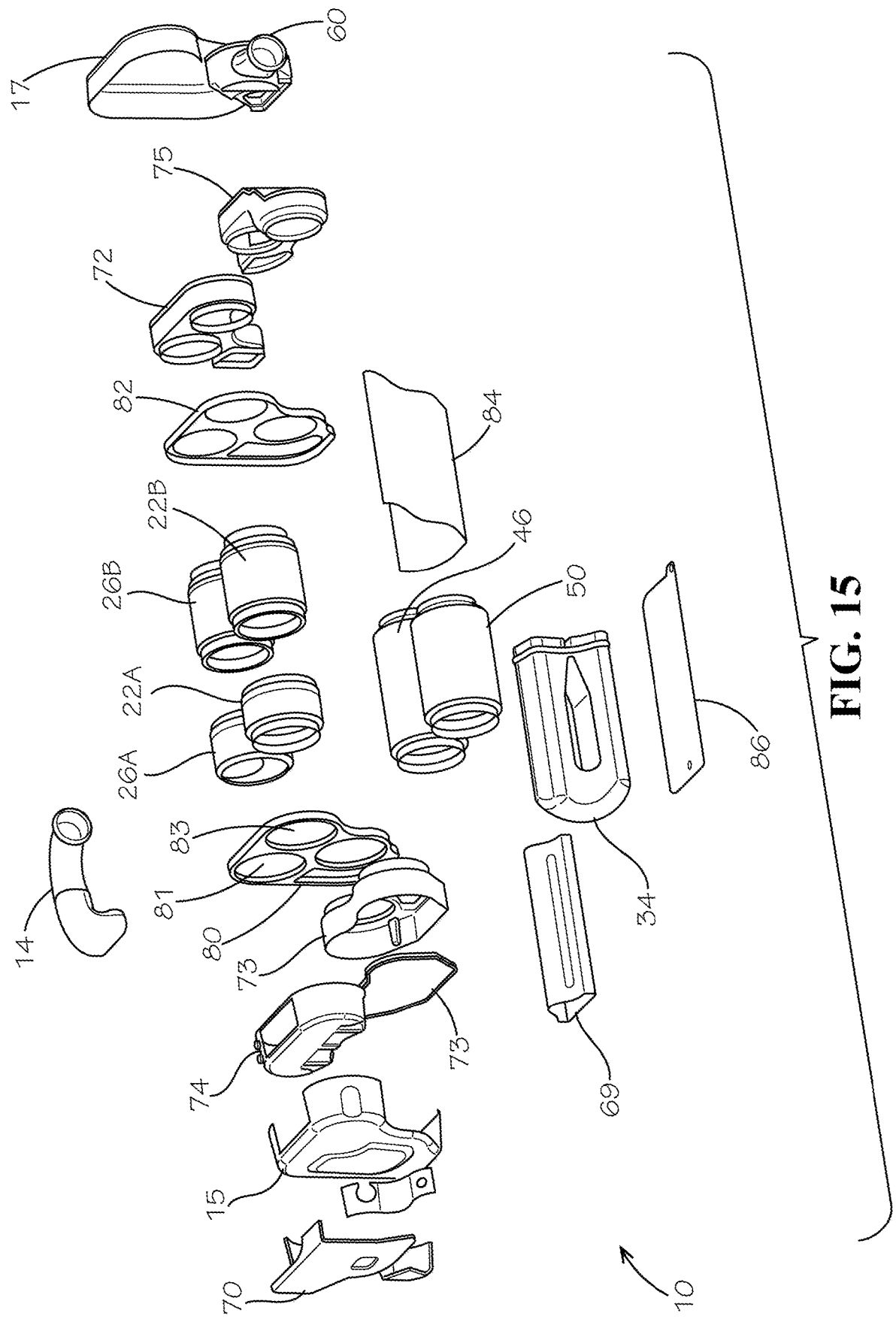
FIG. 15 is an exploded view of components of an exemplary embodiment.

FIG. 15 is an exploded view of the exemplary embodiment of the diesel engine exhaust treatment system 10 illustrated in FIGS. 2-7. The components of the system 10 are shown detached from one another, in order to fully illustrate each component and how they fit with each other. The first stream splitting chamber 74 has an opening where the exhaust gas inlet 14 attaches to allow for exhaust gas to flow into the chamber 74. The two DOCs 22A, 26A and a first component plate 80, which has two holes 81, 83 for engaging the DOCs 22A, 26A, are thus in fluid communication. A first component plate 80 engages both the two DOCs 22A, 26A and the first stream splitting chamber 74 to allow for such fluid communication. The first component plate 80 further fixes the second common chamber 73 with the enclosed SCR 46 to allow for fluid communication, and further aids in fixing the diesel exhaust fluid mixing chamber 34. The externally located SCR 50 is fixed directly to the second common chamber 73. A second component plate 82 fixes the two DPFs 22B, 26B to the first common chamber 72, thereby allowing for fluid communication between the DPFs and ultimately, the SCRs 46, 50. The second component plate 82 further fixes the diesel exhaust fluid mixing chamber 34 to both the first common chamber 72 and the second stream splitting chamber 75 to allow for a single exhaust gas stream to flow from the first common chamber 72 into the mixing chamber 34. That stream then exits the mixing chamber 34 into the second stream splitting chamber 75. The second component plate 82 further fixes the SCR 46 with the second stream splitting chamber 75 to allow for fluid communication. The external SCR 50 is fixed directly to the second stream splitting chamber 75 with no intermediary component plate. The partial covering 12 (which can also act as a heat shield) protects certain exhaust treatment components, except for a single SCR 50 and transfer pipe 69. The transfer pipe 69 is fixed to the second common chamber 73 and the exhaust gas outlet 60, allowing for treated exhaust gas to flow from the second common chamber 73 through the transfer pipe 69 and out through the exhaust gas outlet 60. A plate 86 may be provided to shield the exposed SCR 50 and transfer pipe 69 from road debris or other foreign objects 9 as the diesel truck travels a roadway.

The invention claimed is:

1. A diesel engine exhaust treatment system for treating exhaust gases from a diesel engine of a land vehicle, the diesel engine exhaust treatment system comprising first and second end portions, an exhaust gas inlet, an exhaust gas outlet, and aftertreatment components for treating a flow of diesel exhaust, the aftertreatment components comprising:
  a. At least one diesel oxidation catalyst, each said diesel oxidation catalyst comprising a diesel oxidation catalyst inlet coupled to said exhaust gas inlet and a diesel oxidation catalyst outlet;
  h. At least one diesel particulate filter, each said diesel particulate filter comprising a diesel particulate filter inlet coupled to said diesel oxidation catalyst outlet and a diesel particulate outlet;
  c. At least one diesel exhaust fluid mixing chamber, each said diesel exhaust fluid mixing chamber comprising a mixing chamber inlet coupled to each of the diesel particulate filter outlets and a mixing chamber outlet;
  d. At least one exposed selective catalytic reduction (SCR) converter, each said SCR converter comprising an SCR inlet coupled to said mixing chamber outlet and an SCR outlet; and
  e. At least one transfer pipe, each transfer pipe comprising a transfer pipe inlet coupled to each of said SCR outlets and a transfer pipe outlet coupled to said exhaust gas outlet,
  wherein the aftertreatment components extend in a lengthwise direction from the first end portion to the second end portion.

2. The diesel engine exhaust treatment system for treating exhaust gases from a diesel engine of a land vehicle of claim 1 further comprising a second exposed selective catalytic reduction (SCR) converter, each said SCR converter comprising an SCR inlet coupled to said mixing chamber outlet and an SCR outlet, wherein said second exposed SCR converter also extends in a lengthwise manner from the first end portion to the second end portion.

3. The diesel engine exhaust treatment system for treating exhaust gases from a diesel engine of a land vehicle of claim 1 where said one diesel exhaust fluid mixing chamber comprises an elongated chamber that passes exhaust in a first direction and then in second direction before delivery of said exhaust to an SCR so as to increase vaporization of the urea.

* * * * *